United States Patent
Walter et al.

(10) Patent No.: US 11,340,129 B2
(45) Date of Patent: May 24, 2022

(54) CAPACITIVE PRESSURE MEASUREMENT DEVICE WITH VARYING FREQUENCY

(71) Applicant: IFM ELECTRONIC GMBH, Essen (DE)

(72) Inventors: Heinz Walter, Hergatz (DE); Manfred Maurus, Bad Waldsee (DE); Peter Kimbel, Tettnang (DE); Alexander Oppe, Meckenbeuren (DE)

(73) Assignee: IFM ELECTRIC GMBH, Essen (DE)

( * ) Notice: Subject to any disclaimer, the term of this patent is extended or adjusted under 35 U.S.C. 154(b) by 0 days.

(21) Appl. No.: 16/978,118

(22) PCT Filed: Mar. 7, 2019

(86) PCT No.: PCT/EP2019/055669
§ 371 (c)(1),
(2) Date: Sep. 3, 2020

(87) PCT Pub. No.: WO2019/170798
PCT Pub. Date: Sep. 12, 2019

(65) Prior Publication Data
US 2021/0010892 A1      Jan. 14, 2021

(30) Foreign Application Priority Data
Mar. 7, 2018 (DE) .................... 10 2018 105 234.0

(51) Int. Cl.
*G01L 19/06* (2006.01)
*G01L 9/12* (2006.01)

(52) U.S. Cl.
CPC .............. *G01L 19/069* (2013.01); *G01L 9/12* (2013.01)

(58) Field of Classification Search
None
See application file for complete search history.

(56) References Cited

U.S. PATENT DOCUMENTS

| | | |
|---|---|---|
| 5,000,048 A | 3/1991 | Kordts |
| 2005/0077909 A1 | 4/2005 | Lalla |
| 2007/0227253 A1 | 10/2007 | Kleven |

FOREIGN PATENT DOCUMENTS

| | | |
|---|---|---|
| CN | 1535372 A | 10/2004 |
| CN | 1687730 A | 10/2005 |
| CN | 1951016 A | 4/2007 |
| CN | 102313622 A | 1/2012 |
| DE | 19851506 C1 | 10/2000 |
| DE | 102011083133 A1 | 3/2013 |
| EP | 0361590 B1 | 1/1994 |
| TW | 434402 B | 5/2001 |
| WO | 03010495 A1 | 2/2003 |

OTHER PUBLICATIONS

Chinese Office Action regarding Chinese Patent Application No. 201980030238X (with translation), dated Nov. 24, 2021.

*Primary Examiner* — Lisa M Caputo
*Assistant Examiner* — Nigel H Plumb

(57) ABSTRACT

The disclosure relates to a method for operating a capacitive pressure measurement device. In order to achieve an insensitivity to external signal sources, the disclosure proposes continuously varying the working frequency of the pressure measurement device so that a resonance formation with externally injected (interfering) frequencies is avoided.

9 Claims, 4 Drawing Sheets

CAPACITIVE PRESSURE MEASUREMENT DEVICE WITH VARYING FREQUENCY

CROSS-REFERENCE TO RELATED APPLICATIONS

Figure 1:
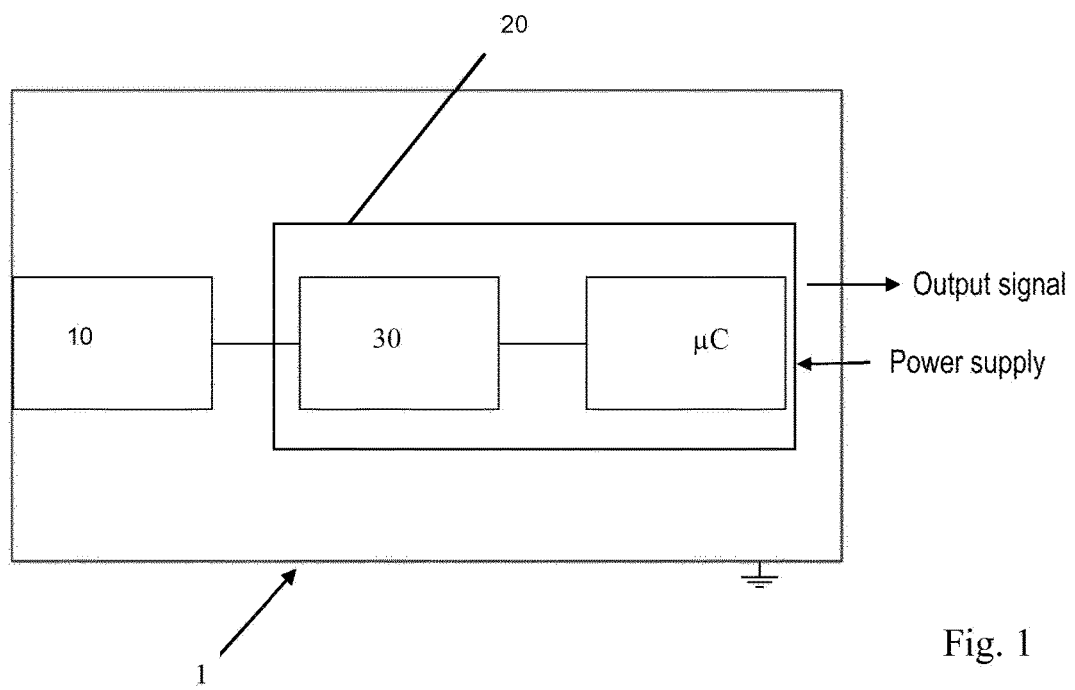

This application is a U.S. National Phase Application under 35 U.S.C. 371 of International Application No. PCT/EP2019/055669, filed on, Mar. 7, 2019, which claims the benefit of German Patent Application No. 10 2018 105 234.0, filed on Mar. 7, 2018. The entire disclosures of the above applications are incorporated herein by reference.

FIELD

The disclosure relates to a method for operating a capacitive pressure measuring cell and a capacitive pressure measuring device.

BACKGROUND

This section provides background information related to the present disclosure which is not necessarily prior art.

Capacitive pressure sensors and measuring devices are used in many industrial areas for pressure measurement. They often comprise a ceramic pressure measuring cell as a transducer for the process pressure and evaluation electronics for signal processing.

Capacitive pressure measuring cells consist of a ceramic base body and a membrane, wherein a glass solder ring is arranged between the base body and the membrane. The resulting cavity between the base body and the membrane enables the longitudinal directed mobility of the membrane as a result of an influence of pressure. At the underside of the membrane and at the opposite top side of the base body, respectively, electrodes are provided which together form a measuring capacitor. Due to the action of pressure a deformation of the membrane is caused, resulting in a change in capacitance of the measuring capacitor.

By the use of an evaluation unit the change in capacity is detected and converted into a pressure measurement value. As a rule, these pressure sensors are used to monitor or control processes. Thus, they are often connected to higher-level control units (PLCs).

From DE 198 51 506 C1 a capacitive pressure measuring device is known, in which the pressure measurement value is determined from the quotient of two capacitance values of a measuring capacitor and a reference capacitor. In this patent specification a pressure measuring cell is not specifically described, but the circuit shown and the method described are suitable for capacitive pressure measuring cells. What is special about this pressure measuring device is that it works with a fixed operating frequency and for the evaluation of the measuring signal at the output, as a measure of the detected pressure measuring value only the amplitude of the square wave signal is relevant, regardless of its frequency.

However, the situation may arise that further signal sources of various types are present in the environment in which the pressure measuring device is used, for example if the measuring device is operated in the vicinity of a frequency converter, so that an injection of the external signal source frequency and thus a resonance formation with the fixed operating or working frequency of the pressure measuring device can arise.

SUMMARY

This section provides a general summary of the disclosure, and is not a comprehensive disclosure of its full scope or all of its features.

The object of the disclosure is to provide a pressure measuring cell or a pressure measuring device which is insensitive to external signal sources.

This object is achieved by the features of the independent claims. Advantageous embodiments of the disclosure are specified in the dependent claims and in the following description.

The inventive concept is to continuously vary the operating or working frequency of the pressure measuring device, so that a resonance formation with externally injected (interfering) frequencies is avoided.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The disclosure is described below in more detail based on exemplary embodiments with reference to the drawings.

Figure 2:
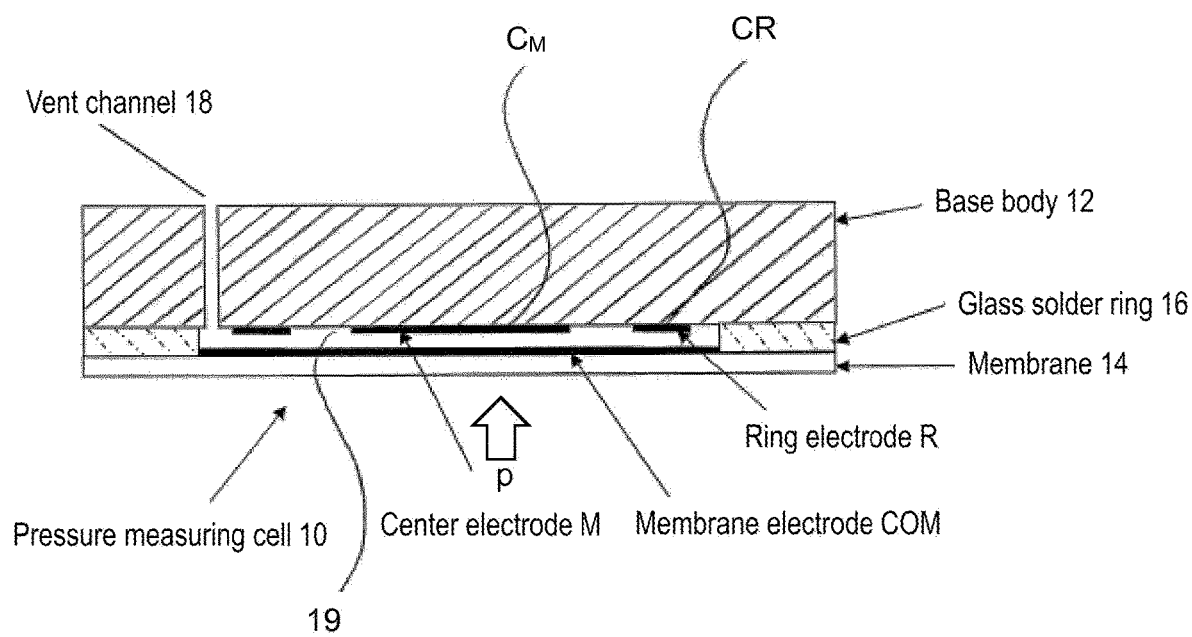
Figure 3:
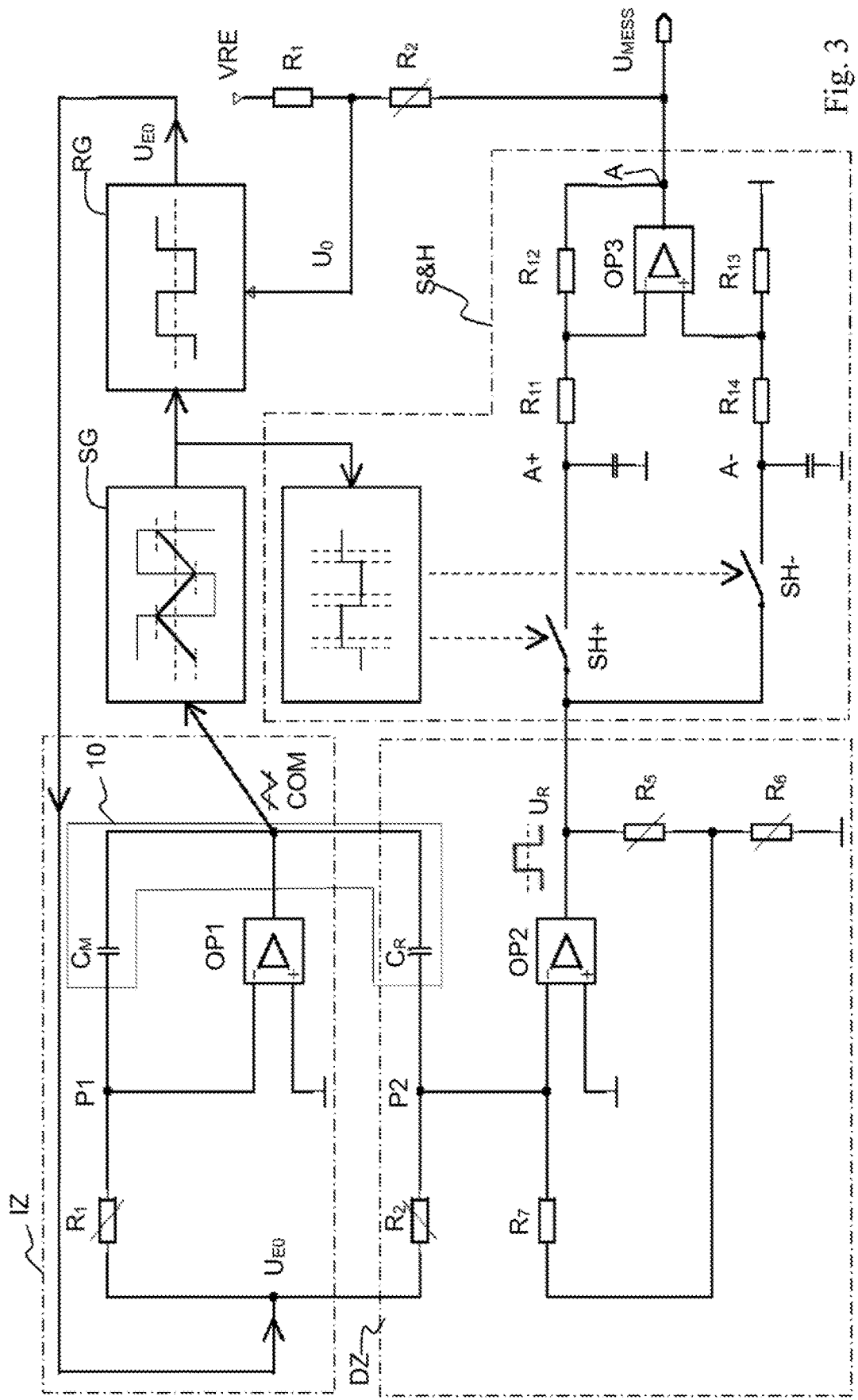
Figure 4:
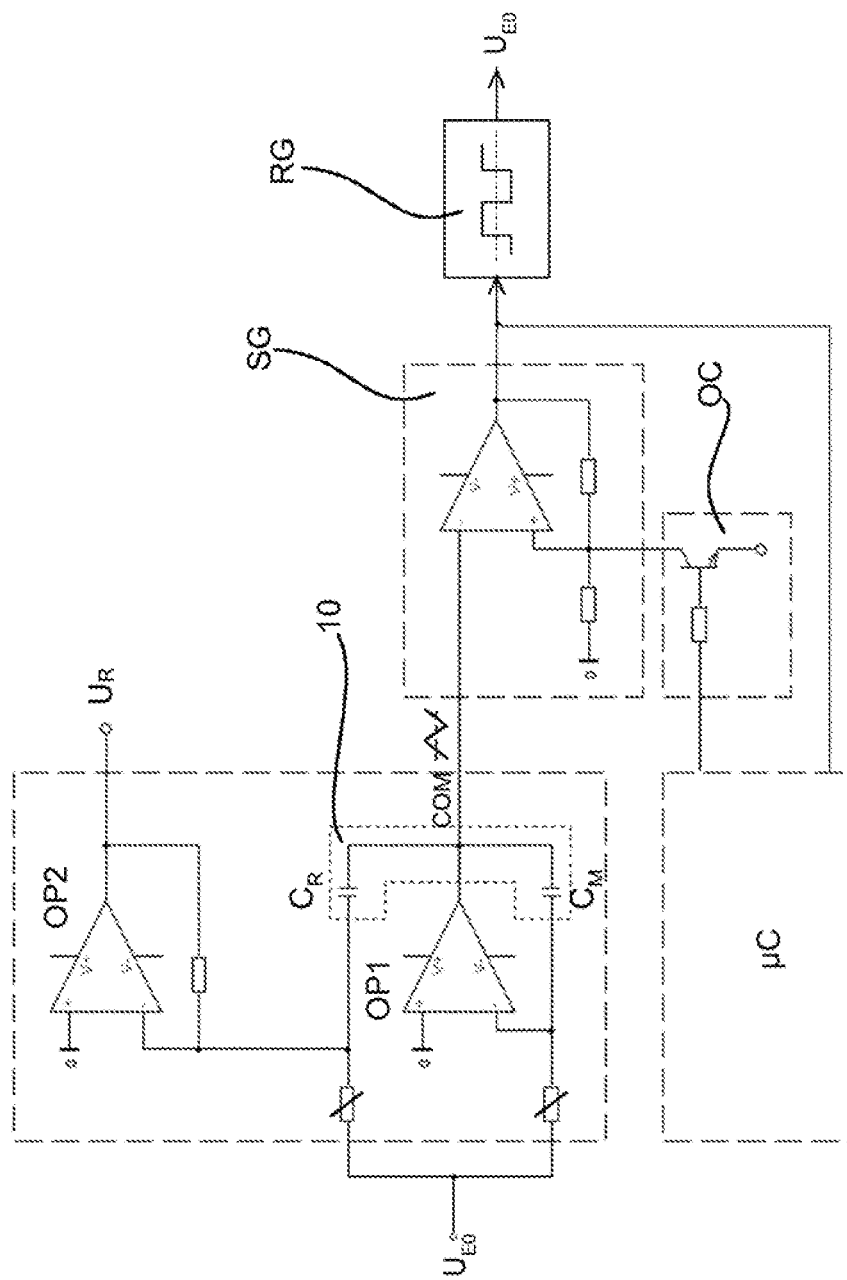
Figure 5:
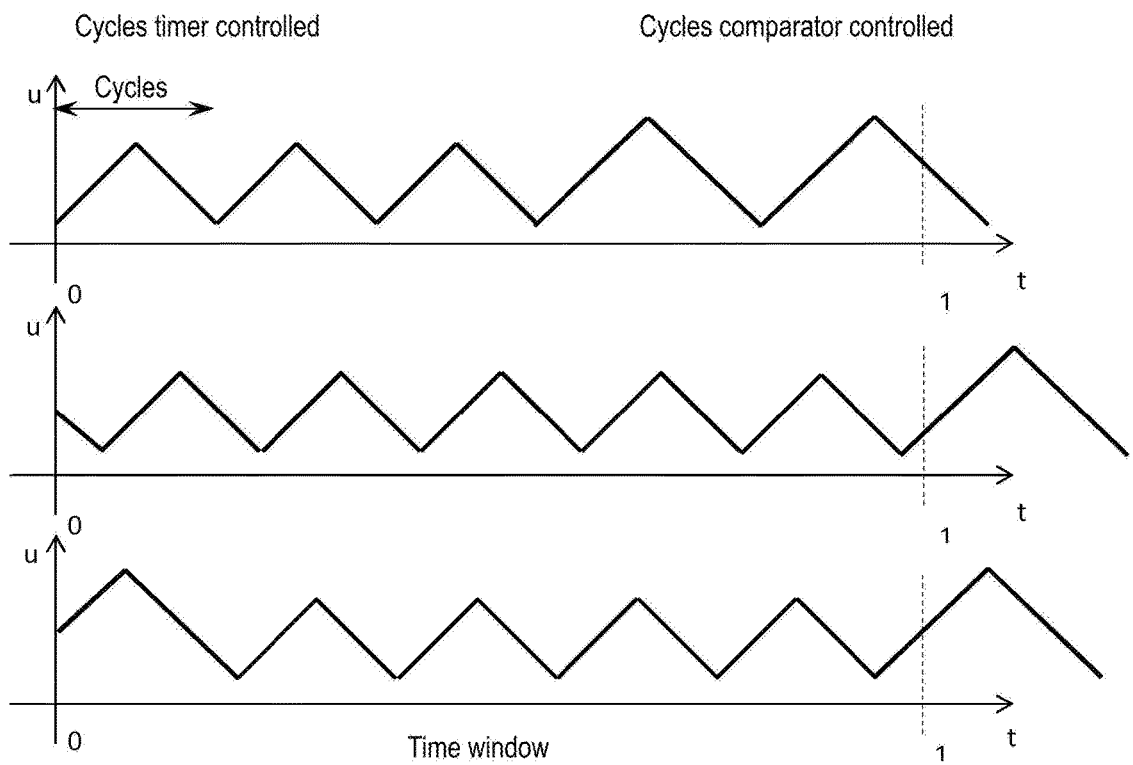

The drawings schematically show:

FIG. 1 a block diagram of a capacitive pressure measuring device;

FIG. 2 a schematic sectional view of a capacitive pressure measuring cell;

FIG. 3 a known evaluation circuit for a capacitive pressure measuring cell according to FIG. 2;

FIG. 4 a section of the evaluation circuit of FIG. 3 supplemented by means for implementing the method according to the disclosure;

FIG. 5 examples of cycle combinations; and

Figure 6:
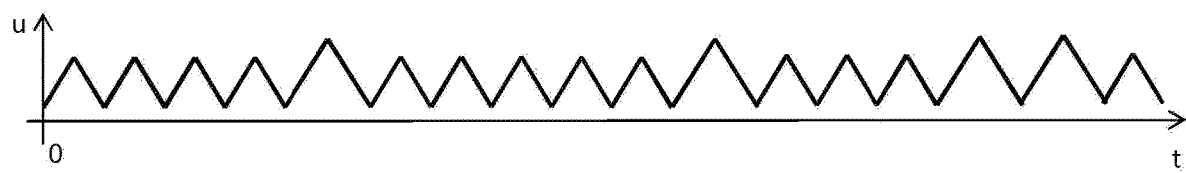

FIG. 6 a sequence of three cycle combinations.

In the following description of the preferred embodiments the same reference symbols designate the same or comparable components.

Corresponding reference numerals indicate corresponding parts throughout the several views of the drawings.

DETAILED DESCRIPTION

Example embodiments will now be described more fully with reference to the accompanying drawings.

FIG. 1 shows a block diagram of a typical capacitive pressure measuring device that is used to measure a process pressure p (e.g. of oil, milk, water, etc.). The pressure measuring device 1 is designed as a two-wire device and essentially consists of a pressure measuring cell 10 and evaluation electronics 20. The evaluation electronics 20 comprises an analog evaluation circuit 30 and a microcontroller μC in which the analog output signal of the evaluation circuit 20 is digitized and processed further. The microcontroller μC provides the evaluation result e.g. to a PLC as a digital or analog output signal. For power supply the pressure measuring device 1 is connected to a power supply line (12-36 V).

FIG. 2 shows a schematic illustration of a typical capacitive pressure measuring cell 10, as is used in a variety of ways in capacitive pressure measuring devices. The pressure measuring cell 10 essentially consists of a base body 12 and a membrane 14, which are connected to one another via a glass solder ring 16. The base body 12 and the membrane 14 delimit a cavity 19 which—preferably only at low pressure ranges up to 50 bar—is connected to the rear side of the pressure measuring cell 10 via a vent channel 18.

Both on the base body 12 and on the membrane 14 several electrodes are provided which form a reference capacitor $C_R$ and a measuring capacitor $C_M$. The measuring capacitor $C_M$ is formed by the membrane electrode ME and the center electrode M, the reference capacitor $C_R$ is formed by the ring electrode R and the membrane electrode ME.

The process pressure p acts on the membrane 14, which corresponding to the pressurisation deflects more or less, wherein substantially the distance between the membrane electrode ME and the center electrode M changes. This leads to a corresponding change in capacitance of the measuring capacitor $C_M$. The influence on the reference capacitor $C_R$ is less because the distance between the ring electrode R and the membrane electrode ME changed less than the distance between the membrane electrode ME and the center electrode M.

In the following, no distinction is made between the designation of the capacitor and its capacitance value. $C_M$ and $C_R$ therefore designate both the measuring and the reference capacitor itself and its capacitance.

FIG. 3 shows a known evaluation circuit 30 for the pressure measuring cell 10 in more detail. The measuring capacitor $C_M$ is arranged together with a resistor $R_1$ in an integrating branch IZ and the reference capacitor $C_R$ is arranged together with a resistor $R_2$ in a differentiating branch DZ. At the entry of the integrating branch IZ a square wave voltage $U_{E0}$ is applied, which preferably varies symmetrically around 0 volts. The input voltage $U_{E0}$ is converted via the resistor $R_1$ and the measuring capacitor $C_M$ by use of an operational amplifier OP1, which operates as an integrator, into a linearly increasing or decreasing voltage signal (depending on the polarity of the input voltage), which is output at the output COM of the integrating branch IZ. The measuring point P1 is virtually grounded by the operational amplifier OP1.

The output COM is connected to a comparator oscillator SG, which controls a square-wave generator RG. As soon as the voltage signal at the output COM exceeds or falls below a threshold value, the comparator SG changes its output signal, whereupon the square-wave generator RG respectively inverts its output voltage.

The differentiating branch DZ further consists of an operational amplifier OP2, a voltage divider with the two resistors $R_5$ and $R_6$ and a feedback resistor $R_7$. The output of the operational amplifier OP2 is connected to a sample and hold circuit S&H. At the output of the sample and hold circuit S&H the measuring voltage $U_{Mess}$ is applied, from which the process pressure p, which acts on the pressure measuring cell 10, is obtained.

The function of this measuring circuit is explained in more detail below. The operational amplifier OP1 ensures that the connection point P1 between the resistor $R_1$ and the measuring capacitor $C_M$ is virtually held at ground. As a result, a constant current $I_1$ flows through the resistor $R_1$, which charges the measuring capacitor $C_M$ until the square wave voltage $U_{E0}$ changes its sign.

It can be seen from FIG. 3 that for the case $R_1=R_2$ and $C_M=C_R$, the measurement point P2 in the differentiation branch DZ is at the same potential as the measurement point P1, that is to say at the mass level, even if the connection between the measurement point P2 and the operational amplifier OP2 would not be present. This applies not only to this particular case, but whenever the time constants $R_1*C_M$ and $R_2*C_R$ are equal to each other. During zero adjustment, this state is set accordingly via the variable resistors $R_1$ and $R_2$. If the capacitance of the measuring capacitor $C_M$ changes due to a pressure effect, the condition of the equality of the time constants in the integrating branch IZ and in the differentiating branch DZ no longer exists and the potential at the measuring point P2 would deviate from the value zero. However, this change is directly counteracted by the operational amplifier OP2 because the operational amplifier OP2 continues to maintain the connection point P2 virtually at ground. At the output of the operational amplifier OP2 therefore a square wave voltage $U_R$ is applied, the amplitude of which depends on the quotient of the two time constants. It can easily be seen that the amplitude is directly proportional to the process pressure $p \sim C_R/C_M-1$, wherein the dependence is substantially linear. The amplitude can be set via the voltage divider, which is formed by the two resistors $R_5$ and $R_6$.

The positive and negative amplitudes A+ and A− of the square-wave signal are determined via a sample and hold circuit S&H and the amount A is output as measuring voltage $U_{Mess}$ at the output of the operational amplifier OP3 and forwarded to the microcontroller μC (not shown). However, it could also be output directly as an analog value. The amplitude of the input voltage $U_{E0}$, which is applied at the output of the square-wave generator RG is set depending on the measuring voltage $U_{Mess}$ in order to achieve better linearity. To this end, a voltage divider consisting of resistors $R_{20}$ and $R_{10}$ is provided. This voltage divider is connected to a reference voltage VREF and is advantageously adjustable.

The positive operating voltage V+ is typically +2.5 V and the negative operating voltage V− is −2.5 V.

FIG. 4 shows a part of the circuit known from FIG. 3, supplemented by the part relevant to the disclosure in the form of a microcontroller μC and a transistor circuit OC which is connected to the comparator oscillator SG. The rest of the parts necessary for further signal evaluation has been omitted for better illustration and can accordingly be extracted from FIG. 3.

The implementation of the inventive concept of varying the operating or working frequency of the pressure measuring device 1 in order to avoid resonance formation with externally injected (interference) frequencies is achieved by the transistor circuit OC, which is designed as an open collector, i.e. the emitter of an NPN transistor is at the level of the negative operating voltage, the collector serves as an output and is connected to the non-inverting input of the comparator oscillator SG. Alternatively, the transistor circuit OC can also be an E/A-port of the microcontroller μC if this is configured as an open collector. The comparator oscillator SG can also be part of the microcontroller μC.

The transistor circuit OC is controlled via a microcontroller μC, which may be identical to the microcontroller known from FIG. 1 and then, in addition to signal processing, implements a further task in the present case with the transistor control. The task of the microcontroller μC relates substantially to the provision of a time-dependent control signal.

The basic structure of the comparator SG consisting of an operational amplifier and a voltage divider is known and corresponds to that of FIG. 3. What is new is the connection to the transistor circuit OC. In the following it is explained how the inventive concept is implemented by the new circuitry.

As already explained a linearly increasing or decreasing voltage signal, i.e. a triangular signal, is applied at the connection point COM and is fed to the comparator SG. In the known, uncontrolled comparator, only the voltage divider specifies the upper and the lower reversal point of the triangular signal and thus determines the—quasi fixed—operating frequency. This is a first mode of operation.

By adding the transistor circuit OC, the upper reversal point can now also be determined in a time-controlled manner by the microcontroller μC if the transistor briefly short-circuits the voltage divider tap at the comparator. The lower reversal point continues to be determined by the unaffected voltage divider at the comparator. With this second mode of operation, the operating frequency can be influenced during the operation.

In order to suppress resonance formation, both working methods are now combined.

The microcontroller μC intervenes in the determination of the reversal point by means of an integrated timing element or timer, however the triangular signal can still only run between the maximum and minimum reversal points defined by the voltage divider. I.e., by the intervention of the microcontroller μC an upper reversal point is set for the triangular signal at the moment, which can only lie between said maximum and said minimum, or if the microcontroller μC does not intervene, as is known from the prior art, the triangular signal runs between the maximum and the minimum reversal points defined by the voltage divider.

By the intervention of the microcontroller μC in the determination of the upper reversal points now a completely variable operating frequency is achieved which is not subjected to any pattern.

First of all, it should be pointed out that the pressure measurement value is determined in fixed time windows, wherein both modes of operation are to be used within a time window and a time window comprises several cycles of the triangular COM signal. The duration of a time window is, for example, 1 ms.

First, a certain number of cycles according to the second mode of operation, i.e. timer-controlled, and subsequently at least one cycle according to the first mode of operation, i.e. comparator-controlled, is executed. For each time window it is specified how many timer-controlled cycles are to be executed according to the second mode of operation. The remaining time is filled with comparator-controlled cycles according to the first mode of operation. The decisive factor here is that the microcontroller μC respectively changes the specification of timer-controlled cycles per time window by one cycle after each time window in order to guarantee a permanent irregularity ("jitter") even under static pressure.

Since the runtime of the cycle combination is not synchronized with the time window, it can happen that the last (comparator-controlled) cycle has not yet been completed after the time window has expired. In this case, the timer-controlled cycles of the new time window start accordingly later, so that the previous (comparator-controlled) cycle can first be terminated. As already stated, the specification for the number of cycles for the next time window is changed by the microcontroller μC in each time window, wherein in the event that the specification regarding the controlled cycles within the time window is not achieved, the microcontroller μC decreases the specified number of timer-controlled cycles for the next time window.

In FIG. 5, the situation described above is exemplary illustrated in the three time windows shown. FIG. 6 shows exemplarily a sequence of three cycle combinations.

For the change in the time window, as can be seen from FIG. 4, the output of the comparator SG is monitored by the microcontroller μC, i.e. read back, and the control of the transistor circuit OC is adapted according to the above embodiment.

By means of this constant change ("jitter") of the running time for a time window a disturbing resonance build up with each time window is broken, because each time window consists of a varying number of cycles, the run times of which also vary.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for operating a capacitive pressure measuring device, wherein the pressure measuring device comprises a pressure measuring cell comprising a measuring capacitor and a reference capacitor, which are applied with an internal excitation voltage in the form of an alternating square wave signal, and wherein the pressure measuring value p is obtained from the capacitance values of the measuring capacitor and the reference capacitor,
wherein the excitation voltage is converted by means of the measuring capacitor by integration into an intermediate signal, and wherein the intermediate signal is fed to a comparator oscillator, as a result of which finally the excitation voltage is generated,
wherein at least one threshold value of the comparator oscillator is changed, so that the excitation voltage has a varying frequency.

2. The method according to claim 1, wherein the comparator oscillator controls a rectangle generator.

3. The method according to claim 1, wherein the frequency is varied according to a predetermined scheme or randomly.

4. The method according to claim 1, wherein variation of the frequency is implemented by means of a transistor circuit, which is connected on the collector side to the non-inverting input of the comparator oscillator and is controlled by a timing element.

5. The method according to claim 4, wherein the timing element is part of a microcontroller.

6. The method according to claim 5, wherein a time window is defined in which a certain number of cycles with a certain variable frequency, determined by the microcontroller are passed.

7. The method according to claim 6, wherein the number of cycles with a variable frequency determined by the microcontroller differs in adjacent time windows.

8. The method according to claim 1, wherein the comparator oscillator is controlled such that the square wave signal at its output has cycles with a variable frequency and cycles with a fixed frequency.

9. The method according to claim 8, wherein the cycles with variable frequency have a frequency determined by the microcontroller and the cycles with a fixed frequency have a frequency not determined by the microcontroller.

* * * * *